US009865033B1

(12) United States Patent
Jafarzadeh et al.

(10) Patent No.: US 9,865,033 B1
(45) Date of Patent: Jan. 9, 2018

(54) MOTION-BASED IMAGE VIEWS

(71) Applicant: Amazon Technologies, Inc., Reno, NV (US)

(72) Inventors: Ario Jafarzadeh, Seattle, WA (US); Vivek Shah, Issaquah, WA (US); Charles Eugene Cummins, Seattle, WA (US); Nicholas Ryan Gilmour, San Jose, CA (US); John Matthew Nance, Seattle, WA (US); Mihir Kumar Choudhary, San Jose, CA (US); Nikhil Raghu Varma, Seattle, WA (US)

(73) Assignee: Amazon Technologies, Inc., Reno ( * ) Notice: Subject to any disclaimer, the term of this patent is extended or adjusted under 35 U.S.C. 154(b) by 132 days.

(21) Appl. No.: 14/158,614

(22) Filed: Jan. 17, 2014

(51) Int. Cl.
*G06T 3/20* (2006.01)
*G06F 3/0346* (2013.01)
*G06T 11/60* (2006.01)
*G06T 3/00* (2006.01)

(52) U.S. Cl.
CPC ............. *G06T 3/20* (2013.01); *G06F 3/0346* (2013.01); *G06T 3/0006* (2013.01); *G06T 11/60* (2013.01)

(58) Field of Classification Search
None
See application file for complete search history.

(56) References Cited

U.S. PATENT DOCUMENTS

| 6,894,719 | B2 | 5/2005 | Blish et al. |
| 7,062,454 | B1 | 6/2006 | Giannini et al. |
| 8,708,817 | B1 | 4/2014 | de la Carcova |
| 8,736,666 | B2 | 5/2014 | Ishida |
| 8,812,989 | B1 * | 8/2014 | Liutikas ................ G06F 3/0488 715/838 |
| 2002/0100199 | A1 | 8/2002 | Bean |
| 2003/0075917 | A1 * | 4/2003 | Frosig ...................... B42D 1/08 281/21.1 |
| 2003/0128287 | A1 | 7/2003 | Fredlund et al. |

(Continued)

FOREIGN PATENT DOCUMENTS

JP          2012099906 A   *   5/2012

OTHER PUBLICATIONS

PCT International Search Report and Written Opinion dated Apr. 17, 2015 issued in application serial No. PCT/US2015/012676.

(Continued)

*Primary Examiner* — Xiao Wu
*Assistant Examiner* — Steven Elbinger
(74) *Attorney, Agent, or Firm* — Hogan Lovells US LLP

(57) ABSTRACT

The display of images, such as panoramic images, in a limited display space can be aided through the use of motion-based control, whereby a user can rotate and/or translate a computing device in order to view different portions of the image, including translating or zooming within the image. Sensors can be used to determine the motion for adjusting the display. The same or other sensors can also assist a user in capturing such an image. For example, a compass can determine the relative orientation of the device and a gyroscope can determine rotation of the device, to determine an appropriate path of motion for the capture and any deviation from that path. The user can be provided with information enabling the user to follow the path with an appropriate device orientation.

19 Claims, 14 Drawing Sheets

(56) References Cited

U.S. PATENT DOCUMENTS

| | | |
|---|---|---|
| 2004/0046885 A1 | 3/2004 | Regan et al. |
| 2004/0157195 A1 | 8/2004 | Andresen |
| 2006/0156254 A1* | 7/2006 | Satake .................... G09G 5/00 715/838 |
| 2007/0046630 A1* | 3/2007 | Hong .................... G06F 1/1626 345/158 |
| 2007/0263071 A1 | 11/2007 | Lee et al. |
| 2007/0290999 A1 | 12/2007 | Cho |
| 2008/0062283 A1 | 3/2008 | Matsushita et al. |
| 2009/0056181 A1 | 3/2009 | Meyer et al. |
| 2009/0234473 A1 | 9/2009 | Andersson |
| 2011/0234832 A1* | 9/2011 | Ezoe .................... H04N 5/232 348/222.1 |
| 2012/0081750 A1 | 4/2012 | Shilbamlya et al. |
| 2012/0113216 A1 | 5/2012 | Seen et al. |
| 2012/0314899 A1* | 12/2012 | Cohen ................ G06F 3/04815 382/103 |
| 2013/0016102 A1 | 1/2013 | Look et al. |
| 2013/0038759 A1 | 2/2013 | Jo et al. |
| 2013/0070143 A1 | 3/2013 | Jang et al. |
| 2013/0155187 A1* | 6/2013 | Skyberg ............. H04N 5/23222 348/46 |
| 2013/0215233 A1 | 8/2013 | Wang et al. |
| 2013/0241925 A1 | 9/2013 | Konami et al. |
| 2013/0314406 A1 | 11/2013 | Lin |
| 2014/0132705 A1 | 5/2014 | Kira et al. |
| 2014/0247325 A1 | 9/2014 | Wu |
| 2015/0062178 A1* | 3/2015 | Matas .................. G06F 3/04845 345/648 |
| 2015/0213784 A1 | 7/2015 | Jafarzadeh |
| 2015/0215526 A1 | 7/2015 | Jafarzadeh |
| 2015/0215532 A1 | 7/2015 | Jafarzadeh |

OTHER PUBLICATIONS

U.S. Non-Final Office Action dated Jun. 22, 2015 issued in U.S. Appl. No. 14/164,046.
U.S. Final Office Action dated Nov. 18, 2015 issued in U.S. Appl. No. 14/164,046.
U.S. Non-Final Office Action dated Jun. 8, 2015 issued in U.S. Appl. No. 14/164,027.
U.S. Notice of Allowance dated Nov. 12, 2015 issued in U.S. Appl. No. 14/164,027.
U.S. Non-Final Office Action dated Apr. 21, 2016 issued in U.S. Appl. No. 14/164,046.
U.S. Non-Final Office Action dated Apr. 8, 2016 issued in U.S. Appl. No. 14/164,012.

* cited by examiner

MOTION-BASED IMAGE VIEWS

BACKGROUND

As people are increasingly utilizing portable computing devices, such as smart phones and tablets, to perform a variety of tasks, there is a need to improve the interfaces and capabilities provided by these and other such devices. For example, users are increasingly using their portable computers to capture images and video, instead of using conventional digital cameras. Problems exist, however, in that it can be difficult for at least some users to capture images such as panoramic images using a portable computing device. Further, the limited space on these devices can affect the way in which these images are displayed to a user, which can impact the ability of a user to view and/or locate images such as panoramic images.

BRIEF DESCRIPTION OF THE DRAWINGS

Various embodiments in accordance with the present disclosure will be described with reference to the drawings, in which.

DETAILED DESCRIPTION

Figure 1:
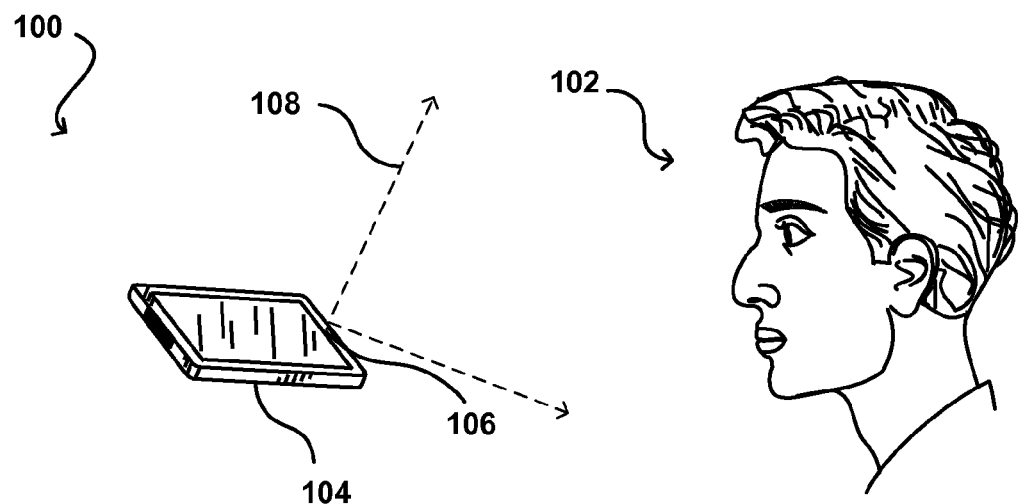
FIG. 1 illustrates an environment in which a user is able to view images displayed on an electronic device in accordance with various embodiments.

Systems and methods in accordance with various embodiments of the present disclosure may overcome one or more of the aforementioned and other deficiencies experienced in conventional approaches to acquiring and/or displaying content using an electronic device. In particular, various embodiments provide assistance to users attempting to capture a panorama or other large format image. Similarly, various embodiments provide interfaces that enable users to easily identify these images, as well as to view different portions of the images.

In various embodiments, an image might have a size or shape that exceeds a determined viewing size or shape. Accordingly, a central portion of that image might initially be displayed. One or more sensors (e.g., motion, orientation, camera, etc.) can be used to determine a tilt, rotation, or other change in orientation of the computing device. Based at least in part upon the determined movement, the displayed portion of the image can update accordingly. For example, as the device is tilted left and right the displayed portion of the image can adjust to the left and to the right by a proportional amount. And the device is tilted up and down the displayed portion of the image can also adjust up and down. In some embodiments, movement of the device towards or away from a user can also cause the displayed portion to zoom in or out with respect to the image. Such an approach can enable a user to view different portions of an image, and help the user to identify irregularly shaped or large format images, for example, when displayed with other images as part of a gallery or other such interface.

Approaches in accordance with various embodiments can also attempt to assist a user in capturing such an image. For example, when capturing a panoramic image a user might want to pan the device along a substantially horizontal path. The computing device can utilize a sensor such as an electronic compass to determine the appropriate path direction, and can utilize sensors such as a gyroscope, inertial sensor, compass, or other such sensor to monitor changes in direction and/or orientation during the capture to attempt to determine how well the user is following the intended path, and whether the user is holding the device without significant tilt or rotation, which can negatively impact the panorama. In at least some embodiments, the device can notify the user when a deviation occurs, and can also attempt to provide guidance for the user to adjust the orientation or location of the device. When the capture is completed, at least a subset of the images can be stitched together to form a panoramic image, or "panorama." In some embodiments, a portion of the camera sensor can be used as an image data buffer that can capture data for a larger field of view. If the motion of the device during the capture would cause portions of the panorama to otherwise be lost, the image buffer data can be used to fill in the gaps. In some embodiments, the buffer data can be used to create the largest possible panorama from the stitched together images. The sensor data can also be used to assist with the stitching process, as information about the relative orientation and/or offset between images can provide a starting point that can help to reduce the processing capacity and memory needed for the stitching process.

Various other applications, processes and uses are presented below with respect to the various embodiments.

FIG. 1 illustrates an example situation 100 wherein a user 102 is attempting to view one or more images displayed on a computing device 104. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture of one or more objects, such as the user 102, contained within a field of view of the image capture element. Each image capture element may be, for example, a charge-coupled device (CCD), a motion detection sensor, or an infrared sensor, or can utilize another appropriate image capturing technology. The device can include other sensors for capturing information as well, such as at least one microphone operable to capture audio data, a motion sensor for detecting motion, an orientation sensor for determining device orientation, and/or a position sensor for acquiring position data, such as geo-data, among others.

Figure 2:
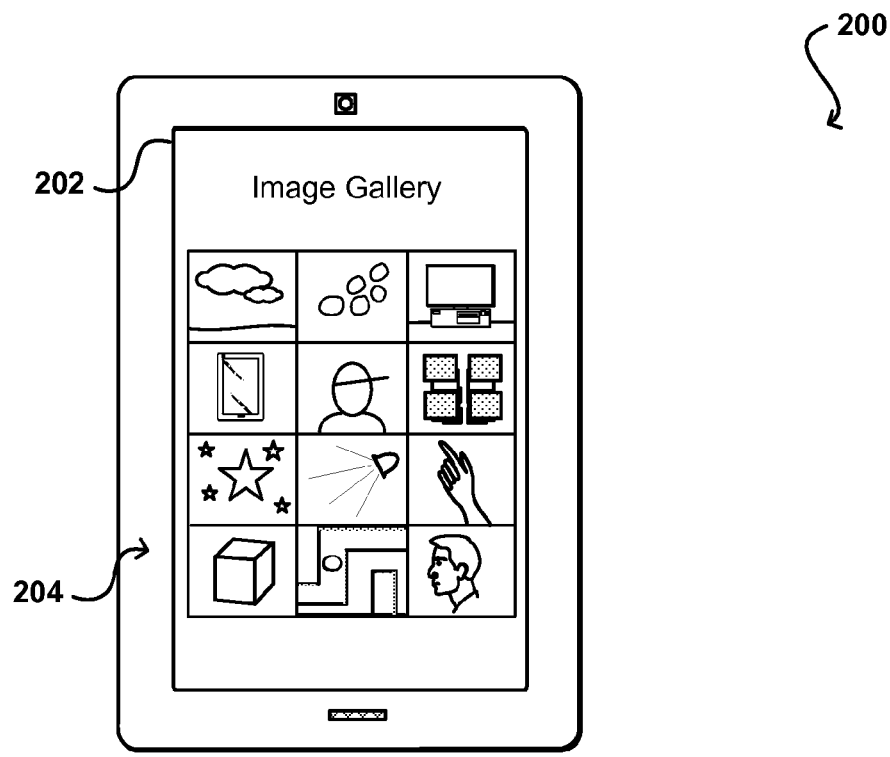
FIG. 2 illustrates an example display of images that can be generated in accordance with various embodiments.

FIG. 2 illustrates an example interface display 200 that can be provided to a user in such a situation, in accordance with various embodiments. In this example, the user has accessed an image gallery 204 or other collection of images to be displayed on a display screen 202 of a computing device. The images can correspond to at least a subset of images stored in a particular location, relating to a particular topic, or otherwise associated by one or more topics or categories, for example. Further, since there is a limited amount of area on the display screen 202, particularly for a portable computing device, and there is a desire to concurrently show a reasonable number of images, the images displayed as part of the gallery can be "thumbnail" images, which as utilized herein refers to any reduced-size, reduced resolution, selected portion, or other such versions of the respective images. As illustrated in the figure, the gallery can be configured to show a number of images (here twelve) at a given time, with the relative sizes of the images being based at least in part upon factors such as the resolution and size of the display screen, a selection or preference of the user, and other such factors.

As illustrated in FIG. 2, each of the thumbnails in the gallery 204 is displayed with the same size and/or aspect ratio. It will often be the case, however, that at least some of the corresponding images will have different aspect ratios. Accordingly, the thumbnail might represent only a selected portion of the corresponding image. In the view of FIG. 2, however, it is not possible to determine which thumbnails correspond to images that have additional information now shown in the thumbnail view.

Figure 3:
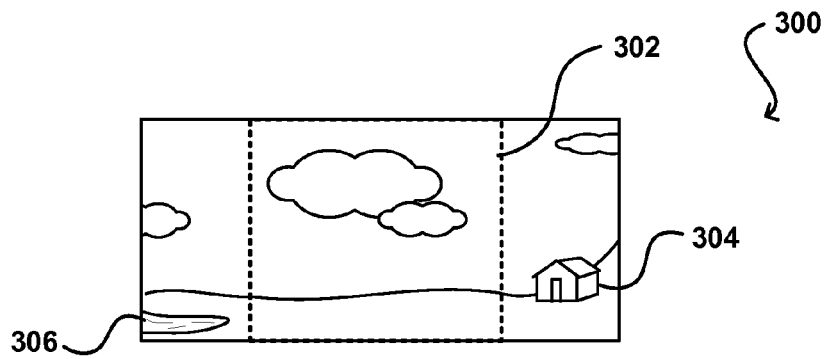
FIG. 3 illustrates an example portion of a panoramic image that can be displayed in an image gallery in accordance with various embodiments.

As an example, FIG. 3 illustrates an example panoramic image 300 that has an elongated aspect ratio. In order for a thumbnail of the image to be properly displayed in the gallery of FIG. 2, a central region 302 of the image can be selected that is of the appropriate aspect ratio for display in the gallery. As illustrated, however, various objects represented in the image would not be shown by the thumbnail. For example, this illustrated panoramic image 300 includes a house 304 and a lake 306 near the edges of the image. If the user is looking for the image including the house and/or lake, the thumbnail region 302 displayed in the gallery would not enable the user to quickly locate that image. Further, a conventional image gallery would provide no indication to the user that the thumbnail being displayed actually corresponded to a panoramic image. Similar issues arise with other large format images, or images with shapes that do not correspond substantially with the aspect ratio of the gallery thumbnails.

Figure 4A:
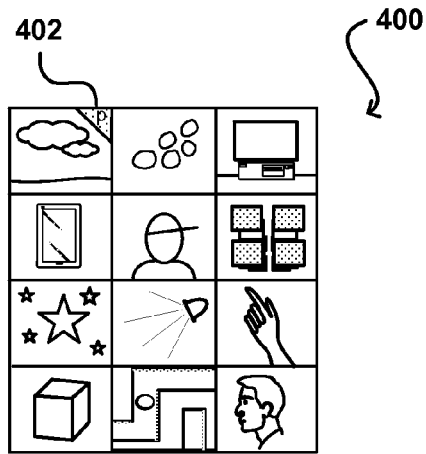
FIGS. 4(a), 4(b), 4(c), and 4(d) illustrate example ways in which panoramic images can be indicated in accordance with various embodiments.

Accordingly, approaches in accordance with various embodiments can attempt to assist a user in identifying panoramic or other images having shapes or aspect ratios that differ from that used for an image gallery or other display approach or format. For example, in the example gallery display 400 of FIG. 4(a), a thumbnail for a panoramic image has an icon 402 or other graphical element displayed proximate and/or overlying the thumbnail, in order to indicate to the user that the corresponding image has one or more portions that are not represented in the thumbnail. Various other approaches can be used as well, such as to use a bounding box, change a color or intensity level of the image, provide indicating text, etc. Such an approach enables a user to quickly identify images that might be of interest, whereby a user can perform an action such as to select the thumbnail to bring up a view of the full image.

Figure 4B:
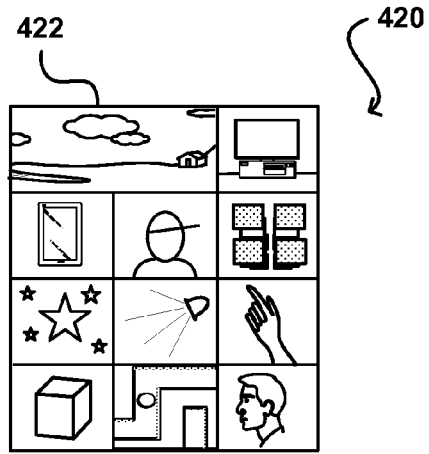

FIG. 4(b) illustrates another example approach to displaying thumbnail images in an image gallery 420 that can be utilized in accordance with various embodiments. In this example, the space utilized for two or more thumbnails can be utilized to display more of a panoramic image 422 or other such image. In this example, two horizontally adjacent thumbnail spaces are combined to display a thumbnail for the panorama, although other numbers of spaces in other arrangements or orientations can be used as well within the scope of the various embodiments. In some embodiments, a fitting process can attempt to determine an optimal combination of spaces to account for the shape of the corresponding image, allowing for the maximum amount of image space to be displayed through the gallery.

Figure 4C:
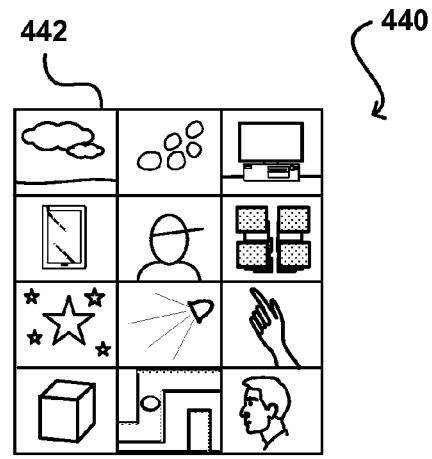
Figure 4D:
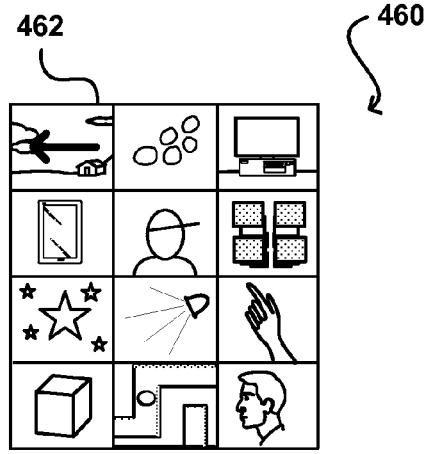

FIGS. 4(c) and 4(d) illustrate another example approach that can be utilized in accordance with various embodiments. In this example approach, the thumbnail for the panorama functions as an animated panorama that utilizes a "moving window" that moves back and forth across the panorama. For example, in the state 440 of the gallery view in FIG. 4(c), the thumbnail illustrates a central region of the panoramic image. The thumbnail can be animated, however, such that different portions of the panorama can appear to move into view, such as illustrated in the example state 460 of FIG. 4(d). In FIG. 4(d), it is illustrated that the thumbnail portion has changed such that the right-hand portion 462 of the panorama, including the view of the house, is displayed in the gallery. In at least some embodiments, the sliding window can appear to move back and forth across the panorama in order to indicate that the image is a panorama, as well as to provide the user with a preview of other portions that are contained within the panorama.

While such an approach has various advantages, there can be disadvantages for at least some users, or the user experience can be less than optimal. For example, there might be several panoramas represented in the gallery, and having each of those animated at the same time can be disconcerting, distracting, or uncomfortable for the user to view. Further, if the user is not interested in which images are panoramas then the animated views can result in a significant amount of wasted resources, including memory, processing capacity, and battery life. Further, such an approach provides no control over the scrolling or sliding window, such that the user might not be able to adequately view a portion of interest to the user. Various other issues can arise as well in different situations.

Accordingly, approaches in accordance with various embodiments can attempt to enable a user to view different portions of a panorama or other such image in a thumbnail or other limited view, as well as to provide the user with control over which portion is displayed at any given time. These approaches can utilize various types of input, as may include motion control and/or head tracking, among other such options.

Figure 5A:
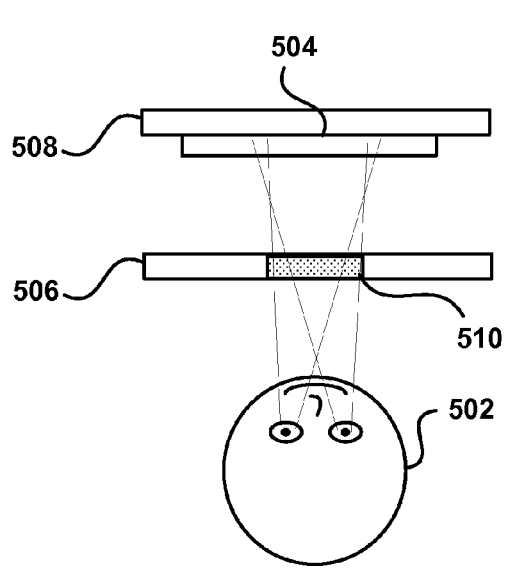
FIGS. 5(a), 5(b), 5(c), and 5(d) illustrate an example approach to displaying portions of an image based at least in part upon a relative orientation of a user that can be utilized in accordance with various embodiments.
Figure 5B:
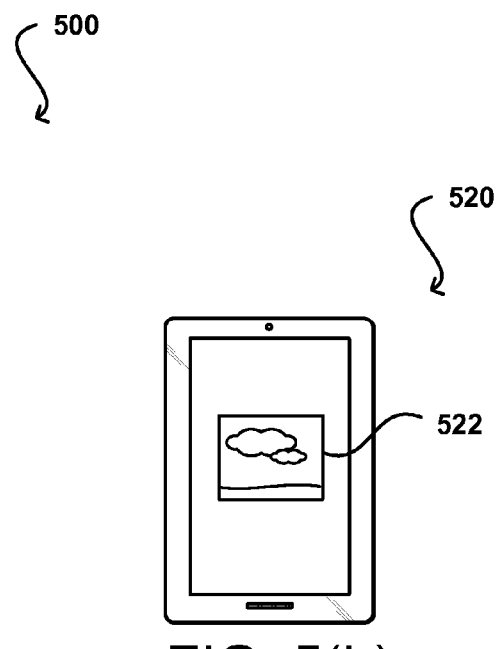
Figure 5C:
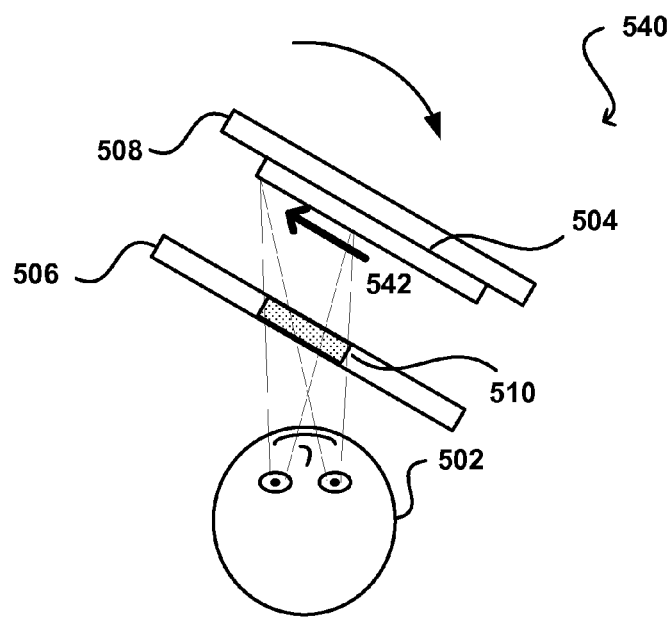

For example, FIGS. 5(a) through 5(d) illustrate an approach based on changes in relative orientation, that attempt to provide a user with control that appears as if the user is looking at the panorama through a window on a computing device. FIG. 5(a) represents an initial configuration 500 wherein the user 502 is generally looking straight on (at a normal to the display screen 506 of the computing device. The thumbnail display is rendered such that it appears as if the user is looking through a window 510 on the display screen 506 to a copy of the panoramic image 504 displayed on a back and/or inner surface 508 of the computing device. As illustrated in the example 520 of FIG. 5(b), such an orientation can result in a central (or other) portion 522 of the panoramic image being displayed, as discussed previously.

Figure 5D:
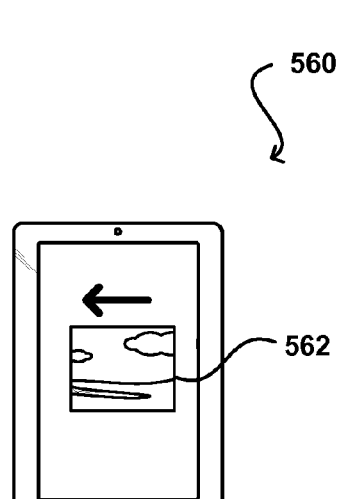

Subsequently, the relative orientation of the user 502 with respect to the computing device might change, whether as a result of movement of the user, the computing device, or both. For example, as illustrated in the example configuration 540 of FIG. 5(c), the computing device has been tilted such that the plane of the display screen 506 is at an angle with respect to the user 502. Accordingly, the portion of the panoramic image 504 that would be visible to the user 502 through the window 510 would have shifted to a different portion 542. FIG. 5(d) illustrates an example situation 560 including the portion 562 of the panoramic image that would be visible to the user for the relative orientation of FIG. 5(c). Based at least in part upon the change in angle, for example, the computing device can determine how to shift the viewable portion, and can move the sliding window by an amount that is proportional to the change in angle. It should be understood, however, that other motions resulting from relative rotations and/or motions can be utilized as well within the scope of the various embodiments.

Figure 6A:
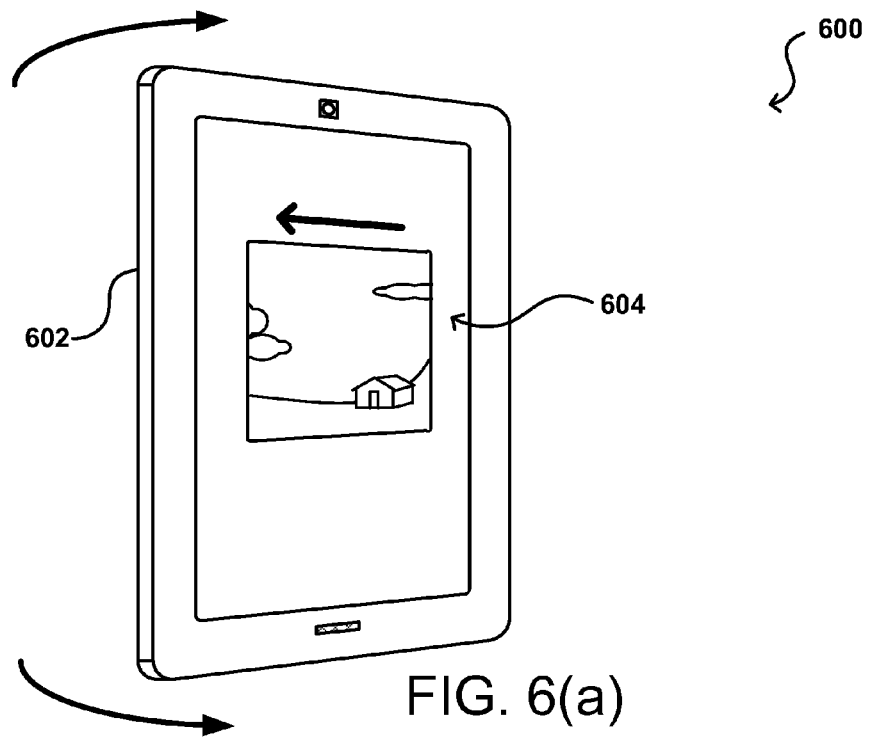
FIGS. 6(a) and 6(b) illustrate an example approach to displaying portions of an image based at least in part upon changes in orientation of the device displaying the image that can be utilized in accordance with various embodiments.
Figure 6B:
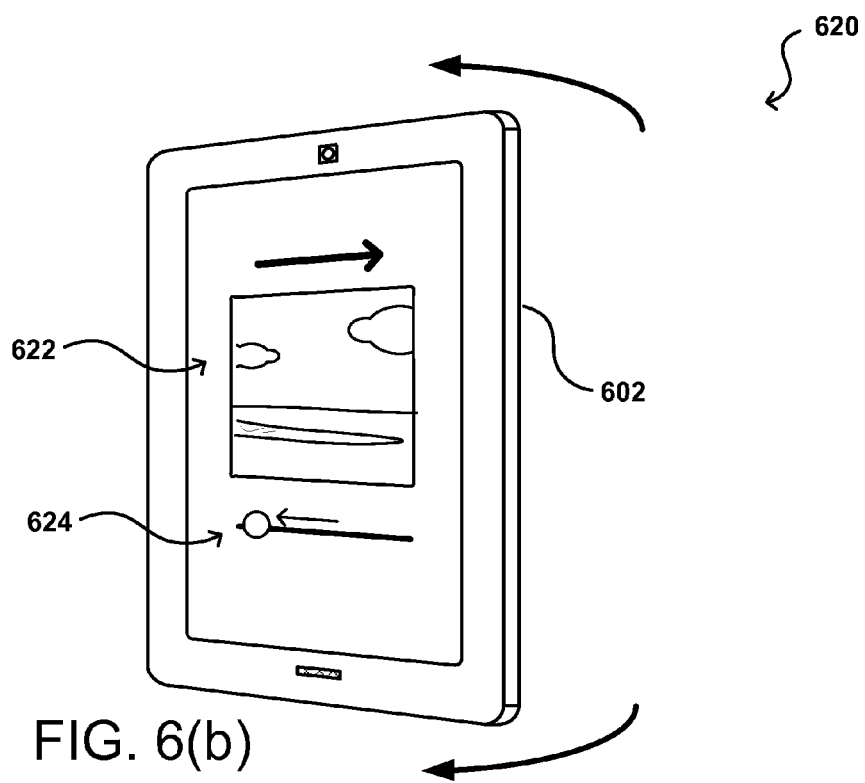

The changes in displayed portions of an image can function outside of a gallery display as well. For example, in the situation 600 of FIG. 6 a single image portion 604 is displayed, such as may have been the result of a user selecting the corresponding thumbnail from an image gallery. In this example, the portion 604 may be a portion of a panoramic image, as discussed previously, or might correspond to any other portion of an image, such as may be the result of panning, zooming, etc. Any other approach to displaying only a portion of an image can be used as well within the scope of the various embodiments. In this example, a rotation of the computing device 602 can cause a different portion of the image to be displayed. For example, in FIG. 6(a) the device 602 has been rotated in a first direction, which causes the sliding window to move in a first direction over the image to display a corresponding portion. In the example situation 620 of FIG. 6(b), the device 602 has been rotated in the opposite direction, such as about a y-axis running up and down through the device in its current orientation. Accordingly, the sliding window has been moved such that a different portion 622 of the panoramic image is displayed. In this example, rotating the device in a first direction can cause the displayed portion to move to a first edge of the image, here the right edge, and rotating the device in the opposite direction can cause the displayed portion to move in the opposite direction, here towards the left edge. Rotations in-between can cause an intermediate portion of the image to be displayed. If the device is returned back to its initial orientation, such as where the plane of the display screen is orthogonal to the viewing direction of the user, then a central portion of the image can again be displayed. In at least some embodiments, an interface element such as a slider bar 624 or other such element can be utilized to convey to the user a sense of how the view correlates to the panoramic image. In this example, the slider of the slider bar can move left and right with the view, such that the user can tell how close the current view is to the center or either of the edges of the panorama. Other approaches can be used to indicate to the user that the user has reached an edge of a panoramic image, such as by causing the computing device to provide audible or haptic feedback, or by causing the image to bounce, flash, or utilize a bounce back motion, among other such options.

Figure 7A:
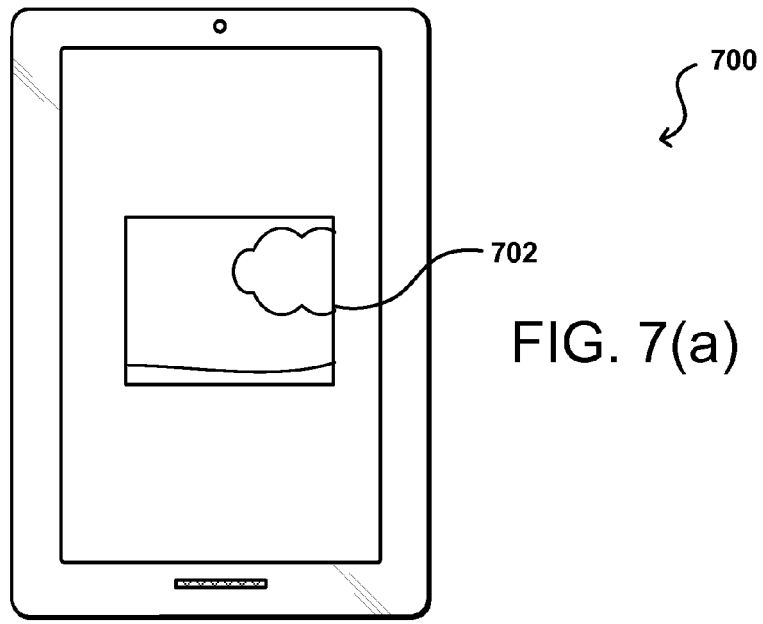
FIGS. 7(a), 7(b), 7(c), and 7(d) illustrate an example approach to displaying portions of an image based at least in part upon changes in orientation of the device displaying the image that can be utilized in accordance with various embodiments.
Figure 7B:
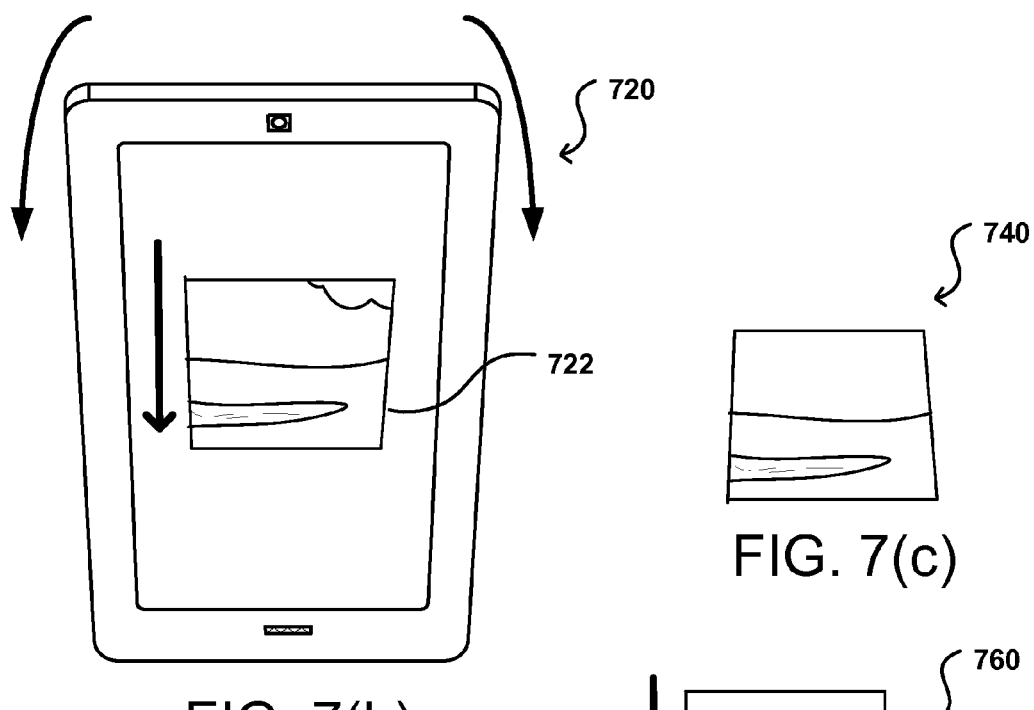
Figure 7C:
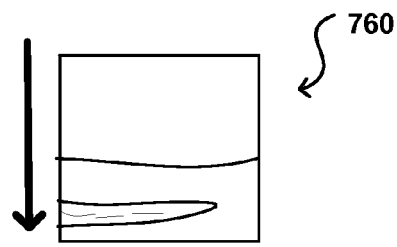
Figure 7D:
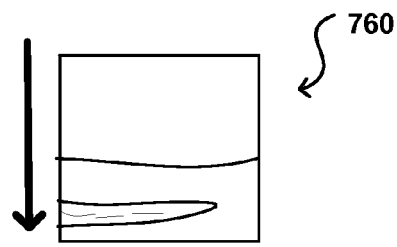

A similar action can be performed for other rotations as well. As an example, the situation 700 illustrated in FIG. 7(a) includes a computing device displaying a first portion 702 of an image. In this example there are additional portions of the image above and/or below the portion that is shown, whether the image is a vertical panorama, is zoomed in, or otherwise has one or more portions that are not currently displayed on the device. Accordingly those portions can be accessed by a change in relative orientation about a different axis, such as a horizontal or x-axis. As illustrated in the example situation 720 of FIG. 7(b), the device has been rotated with the top "forward," causing the displayed portion of the image to move "down" in the image. Thus, a user can access any portion of an image through rotations of the computing device in one or more corresponding directions. Similarly, in at least some embodiments a user can zoom in or out through a translation of the device or another such relative motion. For example, the user can move the computing device in a direction away from the user, or in a direction from front to back according to the current device orientation, in order to zoom out the image. The user can move the device in the opposite direction, in a direction towards the user, in order to zoom into the image. Reverse or other motions can be used as well. Such approaches enable the user to control which portion of an image is displayed at any time, using translations to control zoom level and rotations to control displayed portions at that zoom level, among various other such options. It also should be stated that directions such as "forward" and "up" are used for purposes of explanation and are not requirements on orientation unless otherwise stated. Further, since the rotation can cause some apparent distortion in the image from the perspective of the user, in at least some embodiments the actual displayed image can be distorted such that the shape of the image does not appear to change from the perspective of the user. For example, in FIG. 7(b) the user can rotate the device to change the view, but this also causes the image 722 to appear as a trapezoid and no longer square. In order to enable the user to change the view without distortion effects, a modified version 740 of the image can be rendered, as illustrated in FIG. 7(c). In this example, the tilt or rotation of the device is used to determine an amount of apparent distortion to the user, which then can be applied to the image as rendered. When the user views that image from the tilted device, the apparent shape 760 from the perspective of the user will still be square, as in FIG. 7(d), but the view in the thumbnail will have changed according to the change in orientation.

Figure 8:
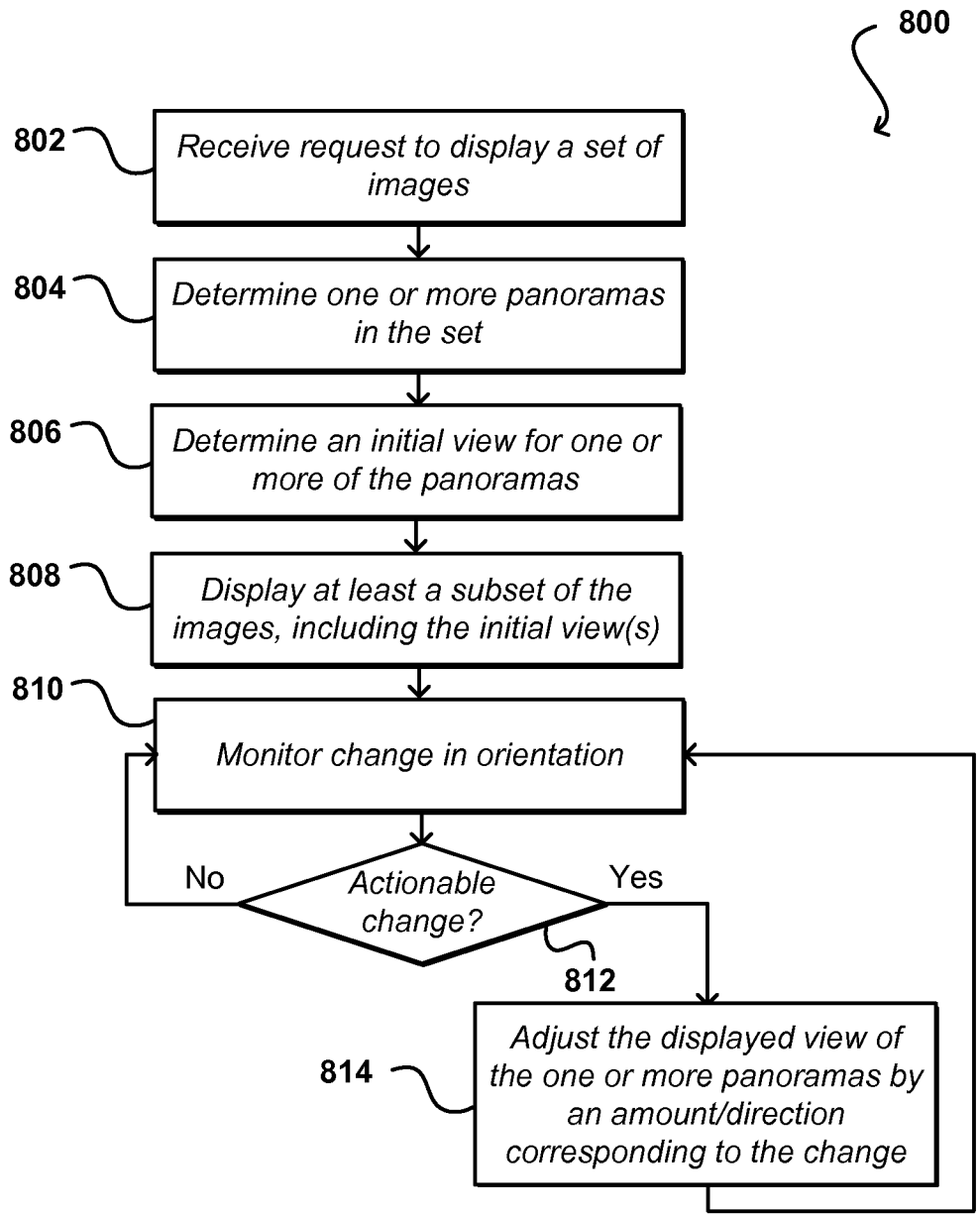
FIG. 8 illustrates an example process for adjusting the displayed portion of one or more panoramic images that can be used in accordance with various embodiments.

FIG. 8 illustrates an example process 800 for controlling the displayed portion or region of a panoramic image in set of image previews that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, a request to display a set of images is received 802, such as to display a set of preview thumbnails for at least a subset of a plurality of images corresponding to the request. A determination can be made 804 to identify one or more panoramic images corresponding to the request. As discussed herein, other types of images with different aspect ratios can be identified as well in various embodiments. For each panoramic image to be displayed, an initial view, or portion of the image to be displayed, can be determined 806. As discussed, this can include selecting a central portion of the image with an aspect ratio matching the aspect ratio of the preview image space in the image gallery, among other such options. At least a subset of the images can be displayed 808, including the initial view for any of the panoramic images to be displayed. As discussed, the number of images to be displayed can be fixed for the image gallery or determined using factors such as the resolution and size of the display screen, among other such options.

While at least a subset of the images is being displayed, the device can monitor 810 changes in relative orientation, such as may be based upon rotations or translations of the computing device or motions of a user, among other such options. For each change, a determination can be made 812 as to whether the change is an actionable change. For example, a user might be allowed to make small changes in orientation of the device due to the user holding the device in the user's hands, without causing a change in the content displayed. Similarly, a user might be able to make small adjustments to the user's head position without changing the content displayed. In at least some embodiments, one or more actionable change thresholds might be used to determine when to update content. For example, the relative orientation of the device with respect to the user might have to change by at least one degree before updating the display of content. In other embodiments there might not be any such threshold or criterion, and the content might be updated with any detectable change in orientation, position, viewing angle, etc. If the change is determined to be an actionable change, the displayed view and/or portion of the displayed panoramic image(s) can be adjusted 814 by an amount proportional to the amount of actionable change, and in a direction corresponding to the actionable change.

Figure 9:
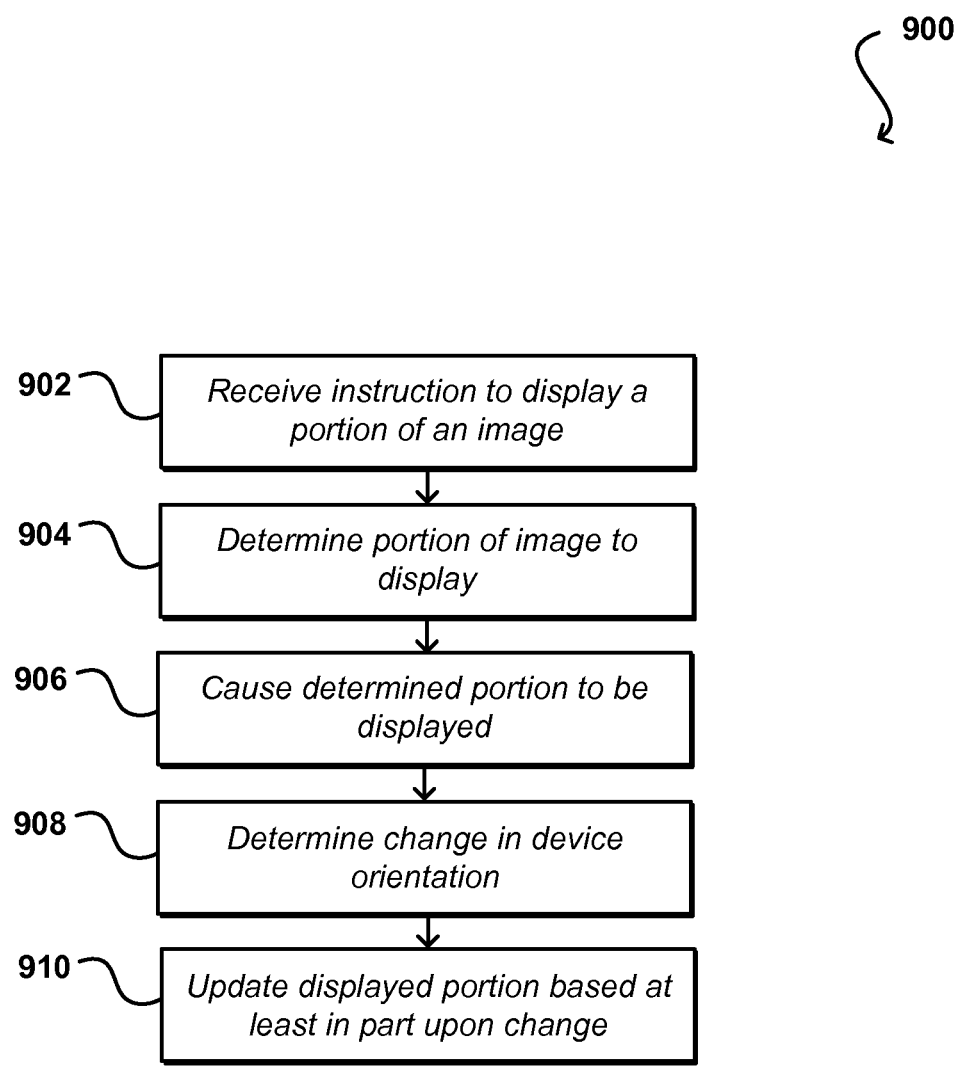
FIG. 9 illustrates an example process for adjusting the displayed portion of an image that can be used in accordance with various embodiments.

As mentioned, similar approaches can be used with any image where at least a portion of that image is to be displayed. For example, FIG. 9 illustrates an example process 900 for updating the displayed portion of an image, which can be utilized in accordance with various embodiments. In this example, an instruction is received 902 to display a portion of an image. In response, the portion of the image to be displayed is determined 904, using any of the approaches discussed or suggested herein. The determined portion then can be caused 906 to be displayed on a target computing device. A change in relative orientation can be determined 908, using any of the various approaches discussed or suggested herein. The displayed portion of the identified image then can be updated 910 based at least in part upon the change, such as in a direction and by an amount proportional to the change in orientation.

As mentioned, there can be various ways to determine changes in relative orientation in accordance with the various embodiments. For example, a computing device might include one or more sensors that can detect changes in motion, direction, and/or orientation. These can include, for example, an inertial sensor, an electronic compass, a gyroscope, an accelerometer, a distance sensor, a proximity sensor, a global positioning system component, and the like. In some embodiments, changes in the orientation of a computing device are used independent of the viewing position of a user. For example, a central portion of an image can be initially displayed, with the current orientation of the device being used as a frame of reference. Any rotation, translation, or other change in orientation with respect to that frame of reference can be used to update the portion of the image that is displayed. For example, a rotation of twenty degrees in one direction might cause the displayed portion to move to the edge of the image in a corresponding direction.

Figure 10A:
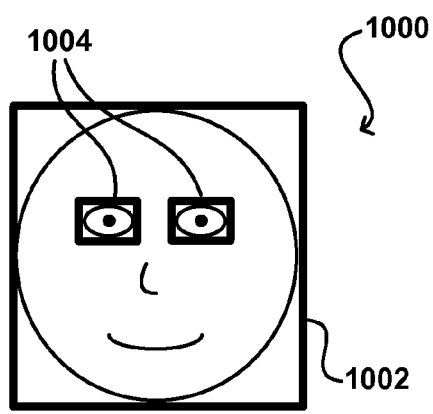
FIGS. 10(a), 10(b), 10(c), and 10(d) illustrate example approaches to performing head tracking that can be used in accordance with various embodiments.
Figure 10B:
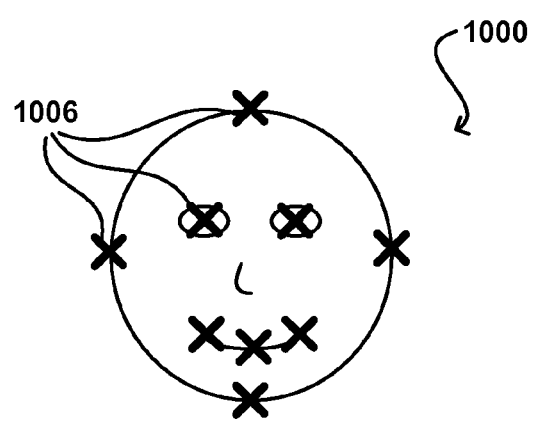

It might be the case, however, that the user and the device move together, such that the relative orientation has not changed and the user would expect the display to not change, such as when the user is in an automobile or swivel chair. Accordingly, in some embodiments at least one camera or other sensor can attempt to determine the relative location of a user, in order to determine changes in relative orientation of the computing device with respect to the user. Various approaches can be utilized for locating one or more desired features of a user's face to determine various aspects useful for determining relative orientation. For example, an image can be analyzed to determine the approximate location and size of a user's head or face. FIG. 10(a) illustrates an example wherein the approximate position and area of a user's head or face 1000 is determined and a virtual "box" 1002 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 1004 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Various other algorithms can be used to determine the location of features on a user's face. For example, FIG.

10(b) illustrates an example wherein various features on a user's face are identified and assigned a point location 1006 in the image. The system thus can detect various aspects of user features and can determine more subtle changes in orientation. Such an approach provides advantages over the general approach of FIG. 10(a) in certain situations, as various other features can be determined, in case the user's eyes cannot be seen due to glasses, hair, etc.

Figure 10C:
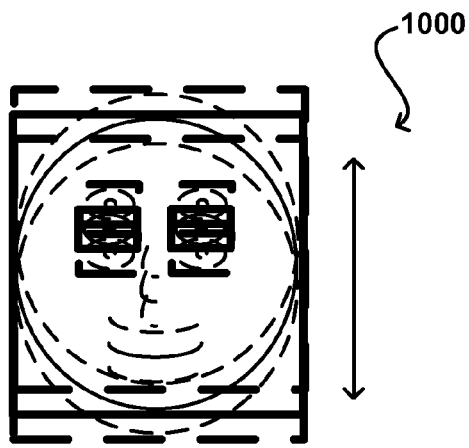
Figure 10D:
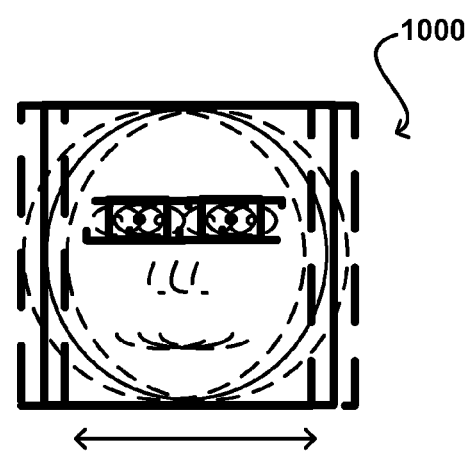
Figure 11A:
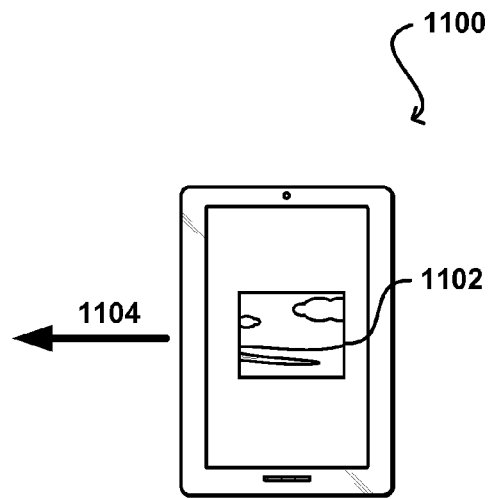
FIGS. 11(a), 11(b), 11(c), and 11(d) illustrate example approaches to assisting with the capturing of panoramic images that can be used in accordance with various embodiments.
Figure 11B:
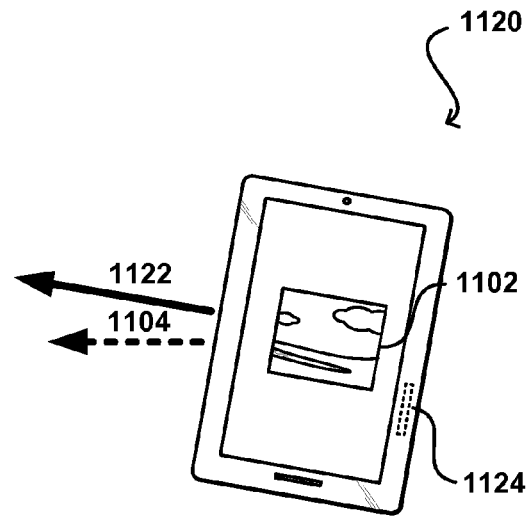
Figure 11C:
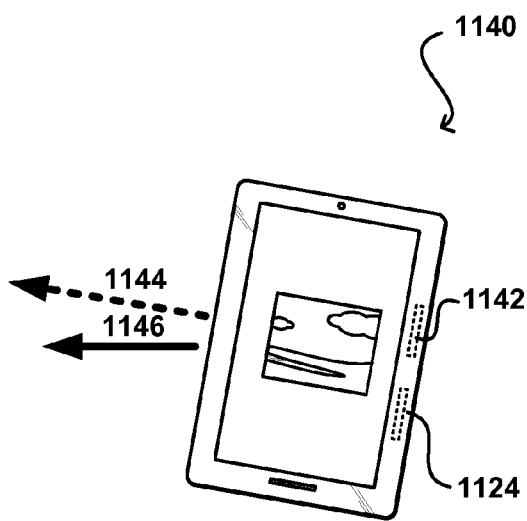
Figure 11D:
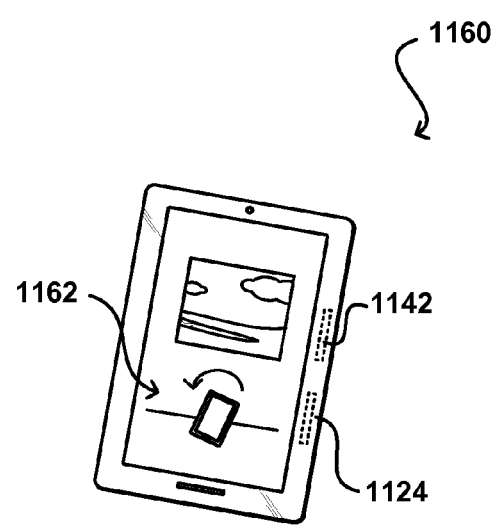

Once the positions of facial features of a user are identified, relative motion between the user and the device can be detected and utilized as input. For example, FIG. 10(c) illustrates an example where the user's head 1000 is moving up and down with respect to the viewable area of the imaging element. As discussed, this could be the result of the user moving his or her head, or the user moving the device up and down, etc. FIG. 10(d) illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also can detect diagonal or other such movements.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, full color images.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred.

As mentioned, it can be desirable in at least some embodiments to utilize at least two imaging elements (i.e., stereoscopic imaging) to determine the location of the user, as well as to capture image information to be displayed. In almost all situations the position of an imaging element will be offset from the eye of a user, such that some image translation and viewing angle adjustments may need to be made to ensure the consistency of the displayed image. Particularly for applications such as image stabilization from the point of view of the viewer, it can be important to compensate for differences in viewing angle resulting from the camera being offset from the user's eye.

In addition to enabling the user to control the portion of a panoramic or large format image that is displayed on a computing device, approaches in accordance with various embodiments can also assist a user in capturing such an image. Using conventional approaches, when a user wants to capture a panoramic image, the user moves the computing device while a camera of the device captures a series of images that are then stitched together. As illustrated in the example situation 1100 of FIG. 11, this often includes a user capturing a series of images where the images 1102 are each displayed as captured, and the user attempts to move the device in a direction 1104 corresponding to the longest length of the panoramic image to be captured. Once the user has completed the motion, corresponding images in adjacently captured images are identified to align the images and then the overlapping portions are stitched together using any of various processes known or used in the art in order to create a single panoramic or other such image. It is often the case, however that a user manually moving the computing device will not follow a substantially linear path, which can cause problem with stitching the images together as the set of images may not all be sufficiently aligned. Significant deviations in path can result in the panorama not being able to be created successfully, or at least including only a portion of the scene that the user intended to capture. A user's hand shaking or other such motions can result in similar issues as well.

In order to help minimize these and other such issues, some devices attempt to use a sensor such as a gyroscope to monitor device motion, such that the user can be notified if the user is starting to deviate more than an allowable, preferred, or other such amount. For example, the device might determine an initial orientation of the device at the start of capture, and might notify the user if the device path moves more than a couple of degrees beyond a lateral motion with respect to that orientation.

Such an approach may not be optimal in all situations, however, as the "desired" or "appropriate" motion is based upon the initial orientation of the device. For example, consider the situation 1120 illustrated in FIG. 11(b). In this example, the computing device is at an angle at the start of the panoramic image capture. Accordingly, the correct path of motion determined by the computing device might also be at an angle 1122 based upon that initial orientation, instead of a substantially horizontal path 1104 that the user might actually desire. A gyroscope 1124 or other motion sensor of the computing device might provide data that determines whether or not the device is following the determined path 1122 based on the original orientation, and notify the user of inappropriate deviation if the user attempts to follow the desired path 1104. Such an approach can result in the user capturing an angled panorama with respect to the scene that might not be acceptable to the user.

Accordingly, approaches in accordance with various embodiments can attempt to use additional sensor data, such as electronic compass data, to attempt to determine an actual path of motion that is not dependent upon the starting orientation of the device. As illustrated in the example situation 1140 of FIG. 11(c), the device can still utilize a sensor such as a gyroscope 1124 to determine changes in orientation. The device can also utilize a sensor such as an electronic compass 1142, however, to determine the initial orientation of the device. The compass data can be used to determine the appropriate path 1146, instead of the path 1144 that might be used based only on the initial orientation and gyroscope data. The gyroscope data and compass data can both be utilized together to determine the deviation from the "correct" path 1146, such that issues with the initial orientation do not negatively impact the overall view contained in the resulting panorama.

In some embodiments, an electronic compass might be sufficient for motion determinations, as the orientation relative to a fixed frame of reference (which is stationary relative to the surface of the earth) can be adequate to determine the orientation and/or path of the device. In many cases, however, the electronic compass will not be sensitive enough to detect small rotations or translations, such that it can be desirable to utilize one or more other motion or orientation sensors, such as a gyroscope or inertial sensor. Various other combinations can be used as well within the scope of the various embodiments.

In some embodiments, the compass data can also be used to notify the user to adjust the orientation of the device. For example, in the example situation 1160 of FIG. 11(d), the device can determine that it is at an angle relative to normal from the ground, for example. If the user has not yet started panoramic capture, or even if the user is in the process of panoramic capture, the device can display at least one graphical element 1162 indicating that the user might want to change the orientation of the device for optimal image capture. In this example, the orientation of the device is shown along with a suggested orientation change. Various other approaches can be used as well. The suggestion might not be followed by the user, as the user may intend for such an orientation, but such functionality may help users more often than not in capturing desirable panoramic or large format images.

Figure 12A:
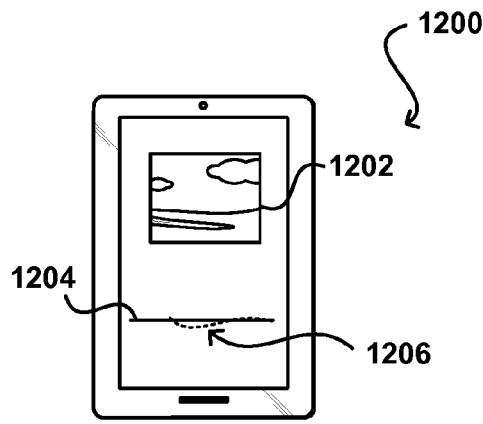
FIGS. 12(a), 12(b), 12(c), 12(d), 12(e), and 12(f) illustrate example displays that can be used to assist with the capturing of panoramic images in accordance with various embodiments.

Various other interface elements or approaches can be used to assist users in panorama capture as well within the scope of the various embodiments. For example, FIG. 12(a) illustrates an example situation where a desired path (such as a floating horizon) 1204 is displayed along with the "live" view 1202 being captured by a camera of the device. The display also includes a determined path of motion 1206 of the device during the capture. Such an approach can indicate any deviation to the user, such that the user can make any necessary corrections. Further, in some embodiments the user might be able to go back over the path if there is an unacceptable amount of deviation, as indicated by the actual path 1206 displayed on the device.

Figure 12B:
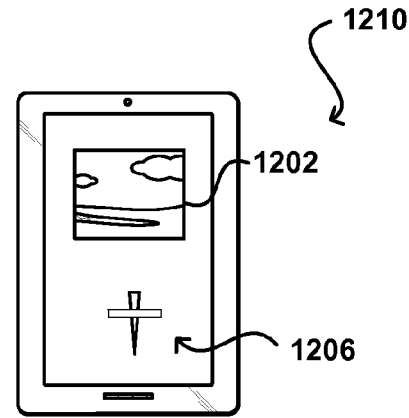
Figure 12C:
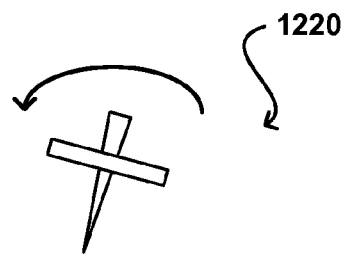
Figure 12D:
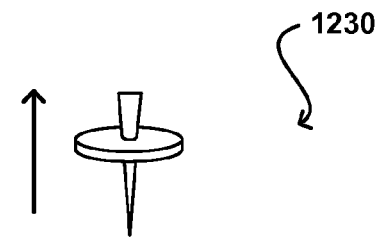

In addition, or alternative, to displaying information about the path of motion, an interface can display information about the orientation of the device, which can also help to ensure proper alignment and/or overlap of images acquired during panoramic image capture. For example, in the example situation 1210 of FIG. 12(b), the device includes a graphical element 1206 that indicates tilt and/or rotation of the device in various directions. Although a virtual top is utilized in this example, is should be understood that any appropriate element for indicating tilt, rotation, or other changes in orientation can be used as well within the scope of the various embodiments. In FIG. 12(b), the element 1206 is shown in a "normal" orientation indicating that the device is not tilted or angled, such as with respect to a normal to the ground, an initial or specified orientation, or another such frame of reference. In the example situation 1220 of FIG. 12(c), the element is shown tilted to one side, indicating that the device is slightly angled and the user might want to adjust the orientation of the device. In the example situation 1230 of FIG. 12(d), the element is shown to be tilted forward, indicating to the user that the user might want to adjust the tilt of the device, as small changes in angle of the device can result in large changes of the information captured by the camera. Various other motions can be used to indicate tilt, rotation, or other changes in orientation. The element also can change in color, brightness, etc., to indicate amounts of deviation from the determined optimal orientation.

Figure 12E:
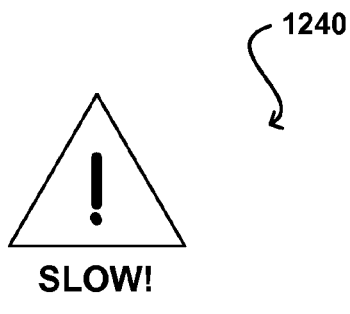
Figure 12F:
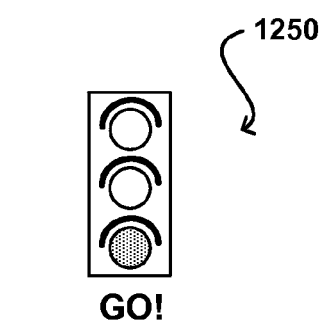

Various other elements can be utilized to notify the user of aspects of the motion that might be less than optimal for panoramic image capture. For example, a device can monitor a speed of the motion using an accelerometer, gyroscope, or other such element, and can determine whether the motion is going too quickly or too slowly. If a motion is going too slowly, there might be wasted processing as the acquired images overlap much more than necessary and the stitching will waste resources. In such instances, an element might be displayed as in the example situation 1240 of FIG. 12(e), indicating that the user might want to increase the speed of motion. Similarly, if a user is moving too quickly, there might not be enough overlap or there might be blur effects in the captured images. Accordingly, an element might be displayed as in the example situation 1250 of FIG. 12(f). Various other graphical elements, as well as sounds and/or haptic feedback, can be utilized as well within the scope of the various embodiments.

Figure 13A:
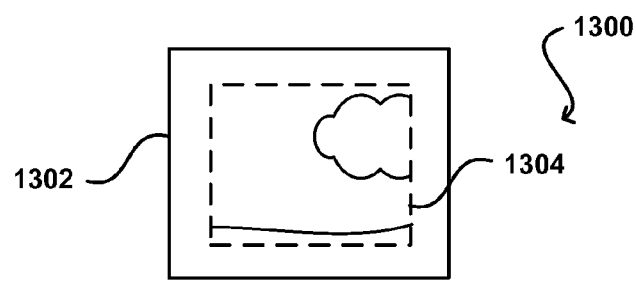
FIGS. 13(a), 13(b), and 13(c) illustrate example approaches to accounting for motion errors using image buffers that can be used in accordance with various embodiments.

In many embodiments, the resolution of each image captured for a panorama can be at less than full resolution of the camera sensor, which can help to save processing power and memory. In such embodiments, it is possible to utilize a central portion of the sensor for the image acquisition, and at least part of the outer region as an image buffer that captures additional image information. For example, consider the example situation 1300 illustrated in FIG. 13(a). In this example, a central region 1304 of a camera sensor 1302 is used for the image acquisition, and this region corresponds to the live view that is displayed on a display of the computing device during image capture. In at least some embodiments, the region of the sensor outside the central region 1304 can also be used to capture image data, providing a larger effective field of view. While this additional image data may not be used, as it is outside the target capture area, the buffer of image data provides some potential advantages.

Figure 13B:
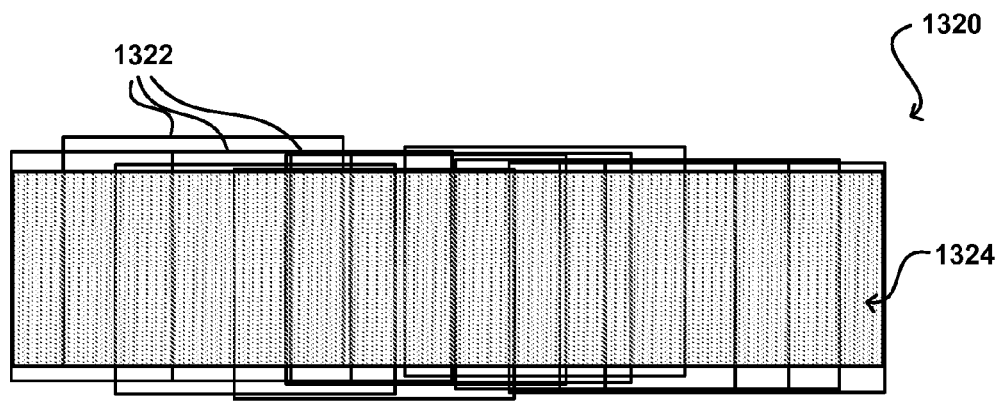
Figure 13C:
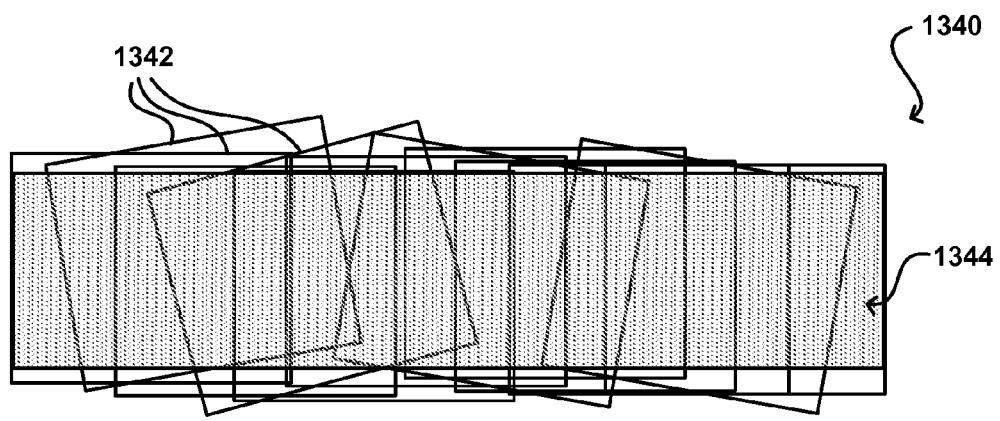

For example, consider the example situation 1320 of FIG. 13(b). A series of overlapping images 1322 is illustrated, as may be stitched together for a panoramic image. As illustrated, however, the path of motion during the capture was not smooth, resulting in images with objects that are vertically displaced from each other. Using conventional approaches, the resulting panorama would be smaller than intended, as the offset would require cropping off of portions that do not include image data across the length of the panorama. In this example, however, the buffer data can be used to fill in the gaps, such that no such cropping is required. A panorama of the intended height can be created that is positioned based on starting position, average position, or another such metric. In some embodiments, the buffer data can be used to create the largest possible panorama, which the user can then crop or adjust if desired. In FIG. 13(d), for example, approaches in accordance with various embodiments can analyze the acquired images, including buffer data, as well as the offsets and can attempt to determine the largest rectangle 1324 that will fit within the combined images. Such an approach can provide the most possible image data, and can minimize the occurrence of lost data due to motion effects. FIG. 13(b) illustrates that such use of the buffer data can also account for rotation and/or orientation errors, at least to a certain extent. As illustrated, the largest possible rectangular region 1344 can again be determined for the combined images 1342, including the image buffer data to minimize loss of image data due to motion irregularities or other such effects. In some embodiments, the sensor data is stored (at least temporarily) for each image to assist in determining the proper overlap and alignment for adjacent images. For example, if the gyroscope data indicates that one image was captured at a five degree tilt or twenty pixel offset distance with respect to the previous image, the matching process can start at that rotation and/or position. This can be particularly useful for handling images with rotation and/or tilt, which can otherwise require significant image processing to locate and match features in the image using conventional image matching processes and algorithms.

Figure 14:
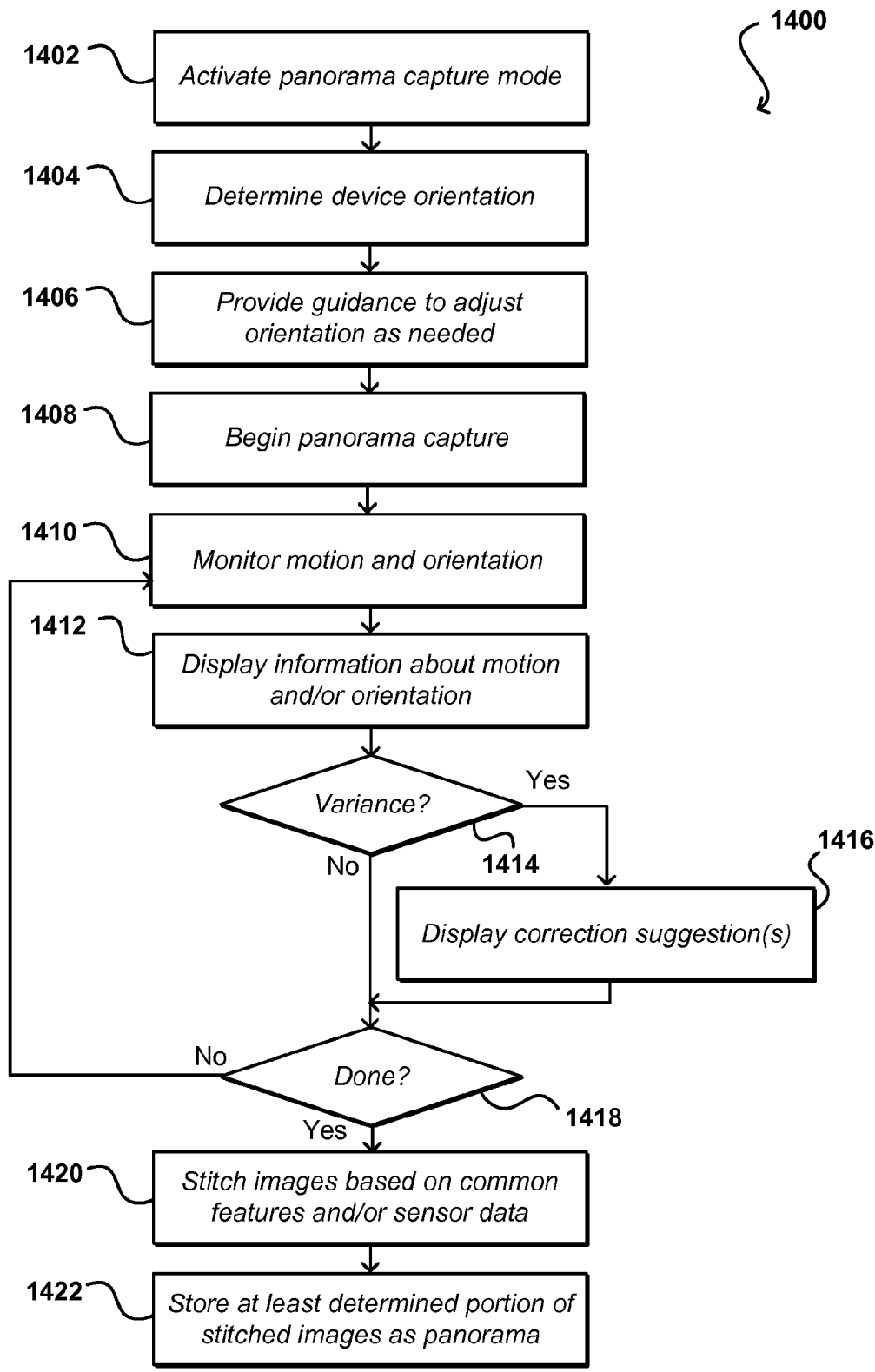
FIG. 14 illustrates an example process for assisting with the capture of panoramic images that can be used in accordance with various embodiments.

FIG. 14 illustrates an example process 1400 for assisting a user in capturing a panoramic image, large format image, or other image that requires multiple individual captures in accordance with various embodiments. In this example, a panoramic (or other such) capture mode is activated 1402 on the computing device. At or before the time of image capture, the device orientation can be determined 1404, such as by using an electronic compass or other such sensor. If the orientation is more than an acceptable deviation from "normal," such as where the device is angled or rotated with respect to a normal vector from the surface of the earth, the device can attempt to provide guidance 1406 to the user to adjust the orientation. As discussed, this can include any of various types of audible, visual, or haptic notifications as discussed and suggested herein. When the user is ready to capture and an instruction or input is received, for example, the panoramic image capture can begin 1408 wherein a series of images is captured, such as at regular timing intervals for a fixed period of time, fixed number of images, until motion is substantially stopped, or another such trigger.

During the period of image capture for the panoramic image, the motion and orientation of the computing device can be monitored 1410. Information about the motion and/or orientation can be displayed 1412 on a display of the computing device, such that a user can determine whether adjustments should be made. A determination can be made 1414 as to whether a deviation in motion and/or orientation exceeds an allowable or threshold amount of variance, and if so one or more correction suggestions can be displayed 1416 or otherwise provided to the user. If the capture has not yet completed, the process can continue. If the panoramic image capture is done 1418, as may be determined using various criteria discussed and suggested herein, at least a subset of the images can be stitched together 1420 based on common features and/or sensor data as discussed herein. As discussed, in some embodiments buffer data can be utilized to attempt to determine the largest possible panoramic image that can be created from the stitched together images. At least the determined portion of the stitched images then can be stored 1422 or otherwise utilized as a panoramic or other such image.

Such capture assistance can be used when the user attempts to capture additional types of images as well. For example, a user might want to capture an image that enables a user to view what the user is seeing, whereby the user pans the camera around the user and the sensor data is used to stitch together an image that the user can view by similarly tilting or panning a viewing device. The sensor data can help with the stitching process, and can help to ensure that the user does not have gaps in the captured image data. In some embodiments, a view of the captured area can be displayed such that the user can know where additional capture is needed. Similarly, if a user is capturing a multiple exposure image, such as an HDR image, the sensor data can help to ensure that the images captured at least exposure (or other such setting) is captured at an appropriate place, or following an appropriate path, etc.

Sensor data can also help with adjusting camera parameters such as auto focus, auto exposure, and auto white balance. For conventional panorama capture, these values are kept fixed such that different images stitched together do not have different appearances. Using sensor data can allow these to be dynamic, such that the computing device can determine how to best merge the images. Data such as the exposure and light settings can be stored for each image, and then used by the device (or a system or service in communication with the device) to determine how to best stitch the images together.

Figure 15:
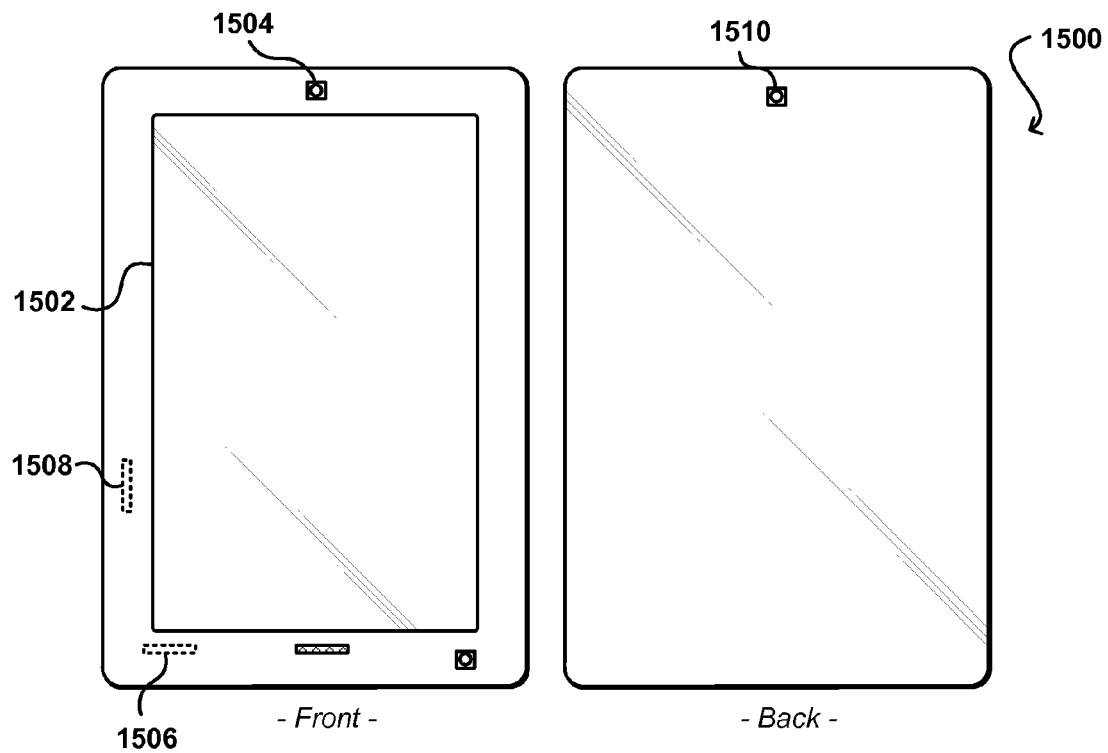
FIG. 15 illustrates front and back views of an example computing device that can be used in accordance with various embodiments.

FIG. 15 illustrates front and back views of an example computing device 1500 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

In this example, the computing device 1500 has a display screen 1502, which under normal operation will display information to a user (or viewer) facing the display screen (e.g., on the same side of the computing device as the display screen). The computing device in this example can include one or more image capture elements, in this example including an image capture element 1504 on the front of the device and an image capture element 1506 on the back of the device, although it should be understood that additional or fewer image capture elements could be used, and could also, or alternatively, be placed on the sides, corners, or other locations on the device. The image capture elements also can be of similar or different types. Each image capture element may be, for example, a camera, a charge-coupled device (CCD), a motion detection sensor or an infrared sensor, or can utilize other image capturing technology. The computing device can also include at least one microphone or other audio capture element capable of capturing audio data. As discussed herein, the device can include one or more motion and/or orientation-determining elements, such as may include an electronic compass 1506 and an electronic gyroscope 1508, as well as an accelerometer, inertial sensor, global positioning sensor, proximity sensor, and the like, which can assist with movement and/or orientation determinations.

Figure 16:
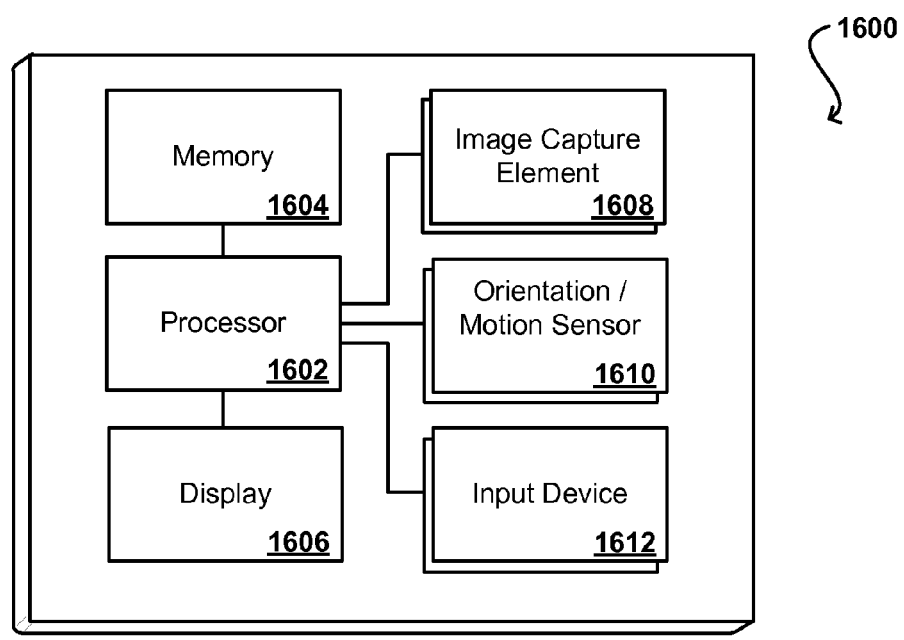
FIG. 16 illustrates example components of a computing device such as that illustrated in FIG. 15.

FIG. 16 illustrates a set of basic components of a computing device 1600 such as the device 1500 described with respect to FIG. 15. In this example, the device includes at least one processor 1602 for executing instructions that can be stored in a memory device or element 1604. As would be apparent to one of ordinary skill in the art, the device can include many types of memory, data storage or computer-readable media, such as a first data storage for program instructions for execution by the at least one processor 1602, the same or separate storage can be used for images or data, a removable memory can be available for sharing information with other devices, and any number of communication approaches can be available for sharing with other devices. The device typically will include at least one type of display element 1606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1608, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail.

It should be understood that image capture can be performed using a single image, multiple images, periodic imaging, continuous image capturing, image streaming, etc.

The device can include at least one motion and/or orientation determining element 1610, such as an accelerometer, digital compass, electronic gyroscope, or inertial sensor, which can assist in determining movement or other changes in orientation of the device. The device can include at least one additional input device 1612 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 17:
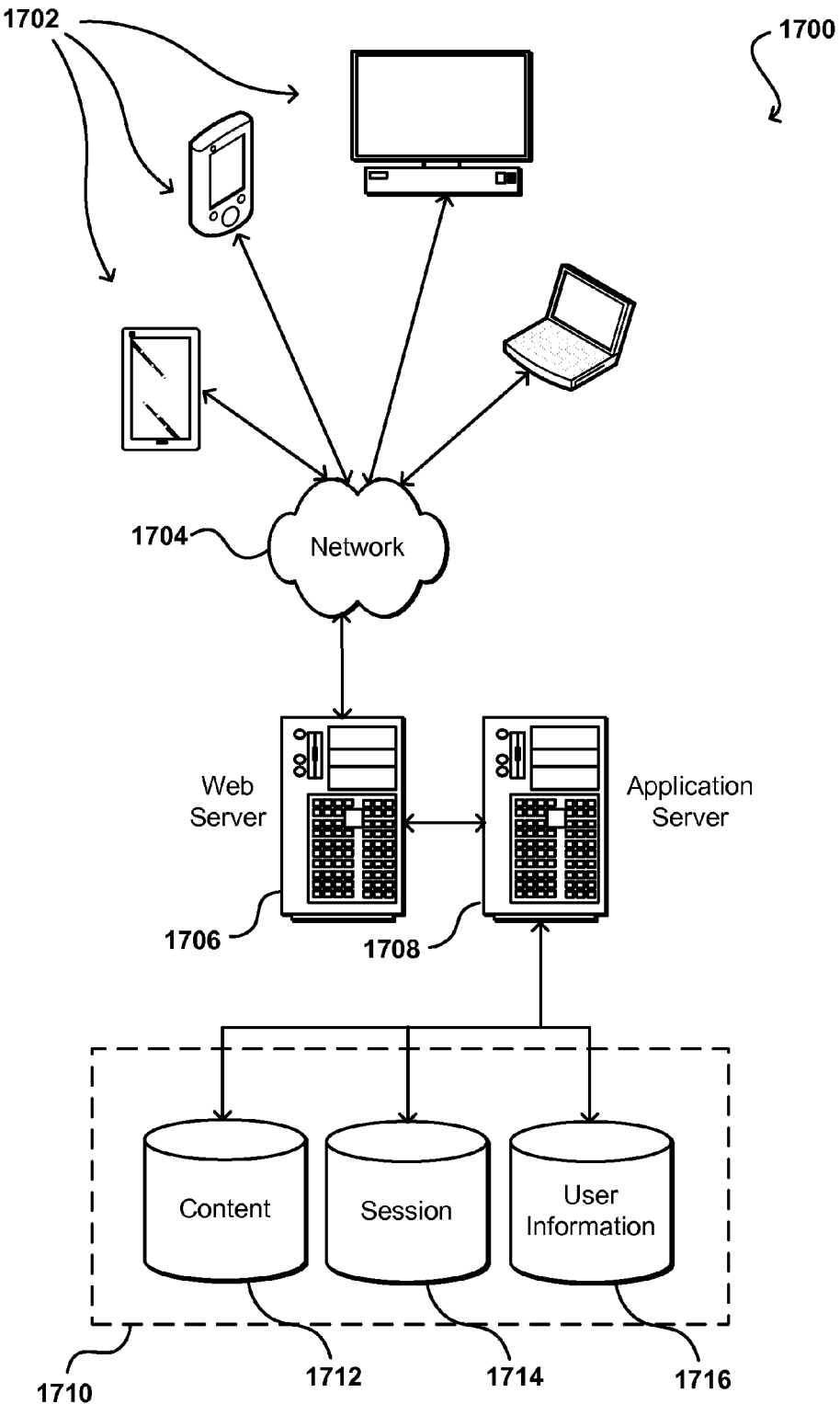
FIG. 17 illustrates an environment in which various embodiments can be implemented.

As discussed, different approaches can be implemented in various environments in accordance with the described embodiments. For example, FIG. 17 illustrates an example of an environment 1700 for implementing aspects in accordance with various embodiments. As will be appreciated, although a Web-based environment is used for purposes of explanation, different environments may be used, as appropriate, to implement various embodiments. The system includes an electronic client device 1702, which can include any appropriate device operable to send and receive requests, messages or information over an appropriate network 1704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1706 for receiving requests and serving content in response thereto, although for other networks, an alternative device serving a similar purpose could be used, as would be apparent to one of ordinary skill in the art.

The illustrative environment includes at least one application server 1708 and a data store 1710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1708 can include any appropriate hardware and software for integrating with the data store 1710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1706 in the form of HTML, XML or another appropriate structured language in this example. The handling of all requests and responses, as well as the delivery of content between the client device 1702 and the application server 1708, can be handled by the Web server 1706. It should be understood that the Web and application servers are not required and are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store illustrated includes mechanisms for storing content (e.g., production data) 1712 and user information 1716, which can be used to serve content for the production side. The data store is also shown to include a mechanism for storing log or session data 1714. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1700 in FIG. 17 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
at least one processor;
a display screen;
an orientation sensor; and
memory including instructions that, when executed by the at least one processor, cause the computing device to:
display a plurality of thumbnail images on the display screen, a determined thumbnail image of the plurality of thumbnail images corresponding to a panoramic image, each of the thumbnail images having a determined aspect ratio;
cause a central portion of the panoramic image to initially be displayed as the determined thumbnail image, the central portion of the panoramic image being displayed at a size corresponding to the determined aspect ratio of the plurality of thumbnail images, and wherein at least one portion of the panoramic image is not initially displayed as the determined thumbnail image;
detect, using the orientation sensor, a change in orientation of the computing device; and
adjust the determined thumbnail image to display a different portion of the panoramic image prior to a selection of the determined thumbnail image, the different portion being determined based at least in part upon a direction and an amount of the change in orientation, and wherein the central portion of the panoramic image is displayed until the determined thumbnail image is adjusted to display the different portion of the panoramic image; and
adjust the determined thumbnail image to a second determined aspect ratio, the second determined aspect ratio corresponding to the combined determined aspect ratio of at least two other thumbnail images of the plurality of thumbnail images.

2. The computing device of claim 1, wherein the orientation sensor is an electronic gyroscope, and wherein adjusting the determined thumbnail image includes panning a display window left or right within the panoramic image according to an amount of rotation determined by the electronic gyroscope.

3. The computing device of claim 1, wherein a subset of the plurality of thumbnail images each correspond to a respective panoramic image, and wherein a determined thumbnail image for each of the subset of the plurality of images is adjusted based at least in part upon the direction and the amount of the change in orientation.

4. The computing device of claim 1, wherein the instructions when executed further cause the computing device to:
determine that the change in orientation at least meets a threshold amount of change before adjusting the determined thumbnail image.

5. A computer-implemented method, comprising:
displaying a first portion of an image on a display element of a computing device, the first portion having at least one of a determined size or a determined shape for the displaying, the image having at least one of a total size or a total shape that exceeds at least one of the determined size or the determined shape for the displaying such that at least one portion of the image is not displayed in the first portion, wherein the first portion is a thumbnail image displayed with a set of additional thumbnails as part of an image gallery display, the thumbnail image and the set of additional thumbnails having the same at least one of the determined size or the determined shape;
detecting a change in orientation of the computing device; and
causing a second portion of the image to be displayed on the display element prior to a selection of the thumbnail image, the second portion having the at least one of the determined size or the determined shape for the displaying, a relative location of the second portion in the image being determined based at least in part upon a direction and an amount of the change in orientation, and wherein the first portion of the image is displayed until the second portion of the image is caused to be displayed based at least in part upon the direction and the amount of the change in orientation of the computing device; and
causing the thumbnail image to be adjusted to at least one of a second determined size or a second determined shape, the at least one of the second determined size or the second determined shape corresponding to the combined determined size or the combined determined shape of at least two of the set of additional thumbnails.

6. The computer-implemented method of claim 5, further comprising:
determining that the image has at least one of a total size or a total shape that exceeds at least one of the determined size or the determined shape for the displaying, and
selecting the first portion of the image from a region proximate a center point of the image.

7. The computer-implemented method of claim 5, wherein the image is a panoramic image having a width greater than a height of the panoramic image, and wherein the first portion is selected to represent image data for the height of the panoramic image.

8. The computer-implemented method of claim 5, wherein the change in orientation is determined using at least one of sensor data captured using an electronic gyroscope or image data captured using at least one camera sensor of the computing device.

9. The computer-implemented method of claim 5, further comprising:
detecting a lateral motion of the computing device along a direction orthogonal to a plane of the display element; and
causing a third portion of the image to be displayed on the display element, the third portion having the at least one of the determined size or the determined shape for the displaying, the third location representing a zoomed in view or a zoomed out view of the second portion.

10. The computer-implemented method of claim 9, further comprising:
capturing image data including a representation of at least a portion of a user of the computing device; and
determining a change in distance between the computing device and the user, the change in distance corresponding to the lateral motion of the computing device.

11. The computer-implemented method of claim 5, further comprising:
determining that the change in orientation at least meets a threshold amount of change before causing the second portion of the image to be displayed.

12. The computer-implemented method of claim 5, wherein the change in orientation is determined at least in part using at least one of an electronic gyroscope, an electronic compass, an accelerometer, an inertial sensor, a camera sensor, a proximity sensor, or a position sensor.

13. A non-transitory computer-readable storage medium storing instructions that, when executed by at least one processor of a computing device, cause the computing device to:
display a first portion of an image on a display element of a computing device, the first portion having at least one of a determined size or a determined shape for the displaying such that at least one portion of the image is not displayed in the first portion, wherein the first portion is a thumbnail image displayed with a set of additional thumbnails as part of an image gallery display, the thumbnail image and the set of additional thumbnails having the same at least one of the determined size or the determined shape;
detect a change in orientation of the computing device; and
cause a second portion of the image to be displayed on the display element prior to a selection of the thumbnail image, the second portion having the at least one of the determined size or the determined shape for the displaying, a relative location of the second portion in the image being determined based at least in part upon the change in orientation of the computing device, and wherein the first portion of the image is displayed until the second portion of the image is caused to be displayed based at least in part upon the change in orientation of the computing device; and
cause the thumbnail image to be adjusted to at least one of a second determined size or a second determined shape, the at least one of the second determined size or the second determined shape corresponding to the combined determined size or the combined determined shape of at least two of the set of additional thumbnails.

14. The non-transitory computer-readable storage medium of claim 13, wherein the instructions when executed further cause the computing device to:
  capture image data representing a relative location of a user of the computing device, wherein the change in orientation of the computing device comprises a change in relative orientation with respect to the user.

15. The non-transitory computer-readable storage medium of claim 13, wherein the instructions when executed further cause the computing device to:
  determine a direction and an amount of the change in orientation, wherein the relative location of the second portion is selected in a direction, from the first portion, that corresponds to the direction of the change in orientation, and wherein the relative location of the second portion is selected with an offset, relative to the first portion, that is proportional to the amount of the change in orientation.

16. The non-transitory computer-readable storage medium of claim 13, wherein the instructions when executed further cause the computing device to:
  display an indication of the relative location of the second portion in the image.

17. The non-transitory computer-readable storage medium of claim 13, wherein the instructions when executed further cause the computing device to:
  detect a lateral motion of the computing device along a direction orthogonal to a plane of the display element; and
  cause a third portion of the image to be displayed on the display element, the third portion having the at least one of the determined size or the determined shape for the displaying, the third location representing a zoomed in view or a zoomed out view of the second portion.

18. The non-transitory computer-readable storage medium of claim 17, wherein the instructions when executed further cause the computing device to:
  capture image data including a representation of at least a portion of a user of the computing device; and
  determine a change in distance between the computing device and the user, the change in distance corresponding to the lateral motion of the computing device.

19. The non-transitory computer-readable storage medium of claim 13, wherein the instructions when executed further cause the computing device to:
  adjust a rendering of the second portion of the image such that the second portion appears to have the same shape as the first portion of the image from a perspective of a user of the computing device.

* * * * *